US012241712B1

(12) United States Patent
Allen

(10) Patent No.: US 12,241,712 B1
(45) Date of Patent: Mar. 4, 2025

(54) PNEUMATIC NAIL PUNCH/DRIVER

(71) Applicant: Ernest Allen, Silberhill, AL (US)

(72) Inventor: Ernest Allen, Silberhill, AL (US)

( * ) Notice: Subject to any disclaimer, the term of this patent is extended or adjusted under 35 U.S.C. 154(b) by 0 days.

(21) Appl. No.: 18/242,478

(22) Filed: Sep. 5, 2023

(51) Int. Cl.
*F41B 11/62* (2013.01)
*B25C 1/00* (2006.01)
*B25C 1/04* (2006.01)
*F41B 11/87* (2013.01)

(52) U.S. Cl.
CPC .............. *F41B 11/62* (2013.01); *B25C 1/008* (2013.01); *B25C 1/042* (2013.01); *F41B 11/87* (2013.01)

(58) Field of Classification Search
CPC ........... F41B 11/60; F41B 11/62; F41B 11/87; B25C 1/04; B25C 1/042
See application file for complete search history.

(56) References Cited

U.S. PATENT DOCUMENTS 5,363,834 A * 11/1994 Stuchlik ................ F41B 11/723 124/76
2019/0022840 A1* 1/2019 Ruecklinger ............. B25F 5/00
2019/0234704 A1* 8/2019 Culiat ..................... F41B 11/55

* cited by examiner

*Primary Examiner* — J. Woodrow Eldred
(74) *Attorney, Agent, or Firm* — Lyman Moulton, Esq.; Moulton Patents, PLLC

(57) ABSTRACT

The super nail punch is the only product of its kind that works with not one, but two cylinders, each carefully crafted to serve a specific purpose, and to ensure the nails are installed and secured correctly. This device is uniquely designed to be safe, simple, and highly functional. It includes interchangeable heads that fit the smallest to the largest nails to be employed in the pneumatic accessory, and guarantees the nails are adequately laid and sunk into any working surface. Moreover, the super nail punch is made with durable materials, a triangulated failsafe LED light, and a safety trigger to ensure long term sustainability, when used in private or commercial settings.

16 Claims, 1 Drawing Sheet

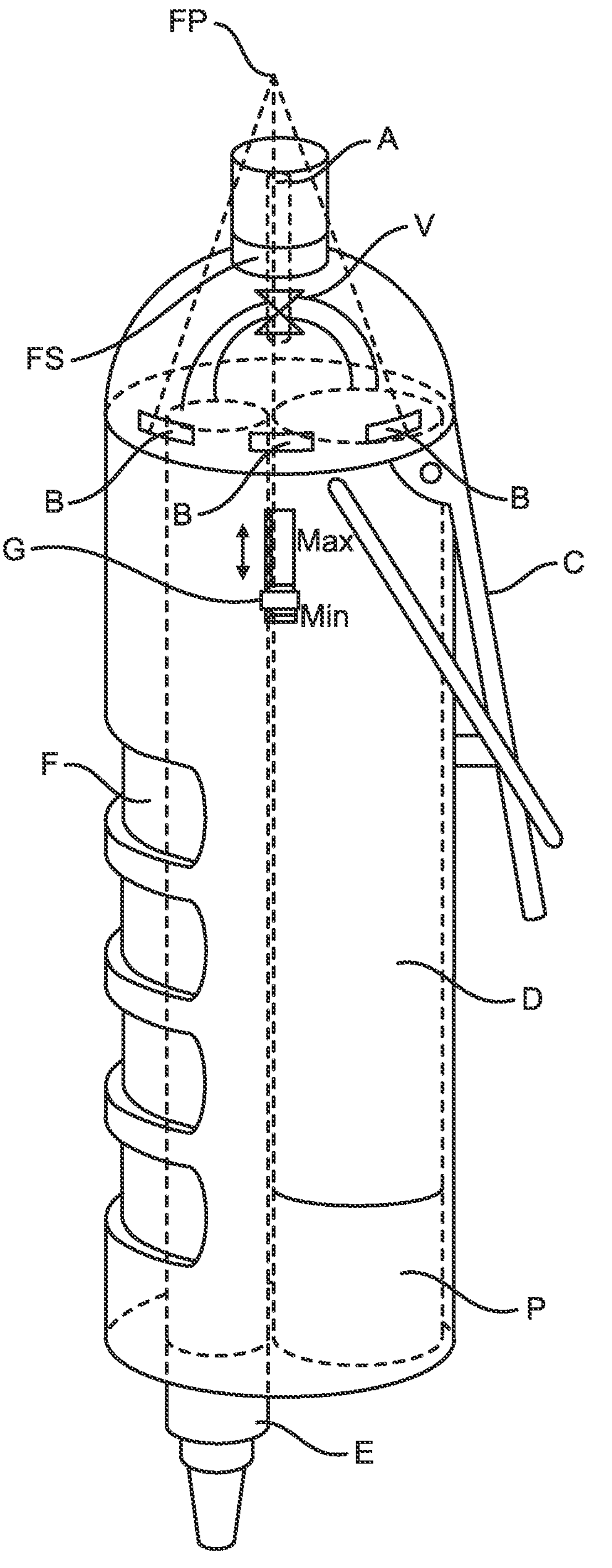
FP
A
V
FS
B
B
B
G
Max
Min
C
F
D
P
E

PNEUMATIC NAIL PUNCH/DRIVER

BACKGROUND

Many construction workers face the problem of dealing with nails that are not properly sunken into a wall, often when performing crown or base construction needs. Relying on historic nail punches that must be punched by hand, is a common tool to remedy the issue; yet, injuries occur from using such generic supplies, leaving workers with wounded fingers which can be incredibly painful and limit their ability to conduct work. There have been no products available as original equipment or as an aftermarket to address this problem.

An apparatus that will ensure that a nail is inserted to a proper depth ensuring it doesn't stick out needing additional labor to hammer it into the proper depth is not being met by any known device or system at present. There have been no products available as original equipment or as an aftermarket to address this problem either.

SUMMARY OF THE INVENTION

The main purpose of pneumatic nail punch/driver is to provide users with a compact, spring loaded, pneumatic nail punch that serves to simplify varied construction tasks.

BRIEF DESCRIPTION OF THE DRAWINGS

FIG. 1 is a top perspective view of the pneumatic nail punch/driver in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a top perspective view of the pneumatic nail punch/driver showing: spring loaded nail punch striker referenced as A, LED light referenced as B, safety trigger referenced as C, CO2 cartridge referenced as D, air-line hook up referenced as E, grip referenced as F, and pressure control button referenced as G, and the pneumatic air source valve V in accordance with an embodiment of the present disclosure. The light emitting diodes are triangulated on the first end adjacent the striker to control driving the nail based on a convergence of the LEDs onto a work product. This is a safety feature that acts as a fail safe to the nail punch driver operating unintentionally to prevent accidents. A fail safe switch FS on the striker or nail striker controls the release of the nail striker when convergence of the triangulation of the LED occurs at a focal point FP on a work product and to stop release otherwise when there is no convergence onto a work product.

The present disclosed pneumatic nail punch/driver, also known as the "Super Nail Punch" offers a modern accessory that not only protects fingers to prevent injury, but also lays and sinks nails perfectly, at all times. The super nail punch introduces two novel cylinders, one for the airline and the other with a strategically placed CO2 cartridge for hard to reach areas. To operate the super nail punch, users simply pull the trigger and a nail punch comes out the end to set the nail for the painters in quick fashion. To further enhance functionality, the super nail punch also includes a pressure control button that allows the user to determine how deep a nail is driven, depending on the type of material and the length of nail being utilized, offering a selection range from 1 to 1—to address diverse nail sizes. This innovative, top-quality product may benefit all individuals who seek to have a more effective, efficient, and safe means of laying nails into materials.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A nail punch driver comprising:

a canister configured to drive a nail under a pneumatic pressure on a first end and to accept a pressurized airline on a second end for the pneumatic pressure;

a pressurized air cartridge comprised in the canister configured as a cordless backup for the pneumatic pressure;

a valve configured to multiplex one of the pressurized air cartridge and the pressurized airline as the pneumatic pressure to drive the nail; and a triangulated light emitting diode disposed on the first end and configured to converge at focal point corresponding to a target for driving the nail.

2. The nail punch driver of claim 1, wherein an air content of the pressurized air cartridge is CO2.

3. The nail punch driver of claim 1, wherein the canister includes a four plangeal grip pattern cutout from an outer surface thereof.

4. The nail punch driver of claim 1, further comprising a lever arm safety trigger configured to shut off the pneumatic pressure by a release thereof.

5. The nail punch driver of claim 1, further comprising a spring loaded lever arm safety trigger configured to enable the pneumatic pressure based on a depression thereof.

6. The nail punch driver of claim 1, further comprising a plurality of LED (light emitting diodes) disposed at the first end configured to illuminate a work product.

7. The nail punch driver of claim 1, further comprising a pressure control sliding button configured to control a pressure of the pressurized airline and the pressurized air cartridge.

8. The nail punch driver of claim 1, further comprising an air pump configured to pump an air pressure from the pressurized airline into the pressurized air cartridge.

9. The nail punch driver of claim 1, further comprising a regulator configured to match a pneumatic pressure of the pressurized airline to a pneumatic pressure of the pressurized air cartridge.

10. The nail punch driver of claim 1, further comprising a regulator configured to match a pneumatic pressure of the pressurized air cartridge to a pneumatic pressure of the pressurized airline.

11. The nail punch driver of claim 1, further comprising a trigger handle set off the canister at a ninety degree angle to the canister.

12. The nail punch driver of claim 1, further comprising triangulated light emitting diodes disposed on the first end and configured to converge at focal point corresponding to a target for driving the nail.

13. The nail punch driver of claim 1, further comprising a fail safe trigger configured to drive the nail only when the light emitting diodes converge on a focal point on a work product.

14. The nail punch driver of claim 1, further comprising a fail safe trigger configured to prevent driving the nail based on a non-convergence of the light emitting diodes on a work product.

15. The nail punch driver of claim 1, further comprising a fail safe trigger configured to control a nail striker on the first end based on a convergence of the triangulated light emitting diode distributed over three locations on the first end.

16. The nail punch driver of claim 1, further comprising interchangeable heads that fit the smallest to the largest nails to be driven in the first end.

* * * * *